United States Patent
Plestid et al.

(10) Patent No.: US 7,885,616 B2
(45) Date of Patent: Feb. 8, 2011

(54) METHOD AND SYSTEM FOR COORDINATING NECESSARY RADIO TRANSMISSION EVENTS WITH UNRELATED OPPORTUNISTIC EVENTS TO OPTIMIZE BATTERY LIFE AND NETWORK RESOURCES

(75) Inventors: Thomas Leonard Trevor Plestid, Ottawa (CA); Muhammad Khaledul Islam, Ottawa (CA); Jeffrey Wirtanen, Kanata (CA)

(73) Assignee: Research In Motion Limited, Waterloo (CA)

( * ) Notice: Subject to any disclaimer, the term of this patent is extended or adjusted under 35 U.S.C. 154(b) by 669 days.

(21) Appl. No.: 11/464,847

(22) Filed: Aug. 16, 2006

(65) Prior Publication Data

US 2008/0045277 A1    Feb. 21, 2008

(51) Int. Cl.
- *H01Q 11/12* (2006.01)
- *H04B 1/04* (2006.01)
- *H04B 1/16* (2006.01)
- *H04B 1/38* (2006.01)

(52) U.S. Cl. .................... 455/91; 455/127.5; 455/343.1; 455/574; 370/311

(58) Field of Classification Search .............. 455/67.11, 455/69, 343.1–343.4, 412.1–414.1, 466, 455/574, 127.5; 370/230, 235, 311, 335, 370/342–345

See application file for complete search history.

(56) References Cited

U.S. PATENT DOCUMENTS

| | | | |
|---|---|---|---|
| 4,566,097 A * | 1/1986 | Bederman | 370/455 |
| 5,371,734 A * | 12/1994 | Fischer | 370/311 |
| 6,055,578 A * | 4/2000 | Williams et al. | 709/253 |
| 6,363,267 B1 * | 3/2002 | Lindskog et al. | 455/574 |
| 6,411,598 B1 | 6/2002 | McGlade | |
| 6,567,396 B1 * | 5/2003 | Pohjanvouri et al. | 370/349 |
| 6,742,186 B1 * | 5/2004 | Roeck | 725/111 |
| 6,885,868 B1 * | 4/2005 | Naim et al. | 455/452.1 |
| 6,965,568 B1 * | 11/2005 | Larsen | 370/238 |
| 6,999,729 B2 | 2/2006 | Wandel | |
| 7,006,844 B2 | 2/2006 | Sarkkinen et al. | |
| 7,013,349 B2 | 3/2006 | Idsinga | |
| 7,085,579 B2 * | 8/2006 | Mizutani et al. | 455/512 |
| 7,092,730 B2 | 8/2006 | Eberlein et al. | |
| 7,161,921 B2 * | 1/2007 | LoGalbo et al. | 370/337 |
| 7,512,070 B2 * | 3/2009 | Stephens | 370/235 |
| 7,672,264 B2 * | 3/2010 | Babin | 370/318 |
| 2003/0012129 A1 | 1/2003 | Lee | |
| 2004/0185857 A1 | 9/2004 | Lee | |

(Continued)

FOREIGN PATENT DOCUMENTS

WO    2005072494    8/2005

(Continued)

OTHER PUBLICATIONS

European Examiner's Report pursuant to Article 96(2) EPC, EP 06118984.1 dated Aug. 30, 2007.

(Continued)

*Primary Examiner*—Simon D Nguyen
(74) *Attorney, Agent, or Firm*—Moffat & Co.

(57) ABSTRACT

A method and apparatus for sending an event from user equipment operating in a mobile network, the method comprising the steps of: monitoring whether an unrelated opportunistic event has occurred; and sending said event with said unrelated opportunistic event.

25 Claims, 5 Drawing Sheets

U.S. PATENT DOCUMENTS

| | | | |
|---|---|---|---|
| 2005/0025167 A1* | 2/2005 | Ishibashi et al. | 370/412 |
| 2005/0156712 A1 | 7/2005 | Jyrinki | |
| 2005/0237968 A1 | 10/2005 | Womack et al. | |
| 2006/0159245 A1* | 7/2006 | Kim et al. | 379/201.01 |
| 2007/0298848 A1* | 12/2007 | Babin | 455/574 |
| 2008/0039032 A1* | 2/2008 | Haumont | 455/115.1 |

FOREIGN PATENT DOCUMENTS

WO 2006059206 6/2006

OTHER PUBLICATIONS

International Search Report, dated Oct. 5, 2007.

* cited by examiner

METHOD AND SYSTEM FOR COORDINATING NECESSARY RADIO TRANSMISSION EVENTS WITH UNRELATED OPPORTUNISTIC EVENTS TO OPTIMIZE BATTERY LIFE AND NETWORK RESOURCES

FIELD OF THE DISCLOSURE

The present disclosure relates to battery life management on wireless user equipment (UE) and of network resource management in a wireless network, and in particular pertains to presence signaling of the user equipment.

BACKGROUND

A universal mobile telecommunication system (UMTS) is a broadband, packet based system for the transmission of text, digitized voice, video and multi-media. It is a highly subscribed to standard for third generation wireless devices and is generally based on Wideband Code Division Multiple Access (WCDMA).

In operation of an always-on push service, the disclosure layer of the UE typically sends "keep-alive" data to presence agents required for always-on push applications. In most circumstances, the "keep alive" message is sent as a result of a keep alive timer expiring. When the keep alive timer expires, the UE connects to the universal terrestrial radio access network (UTRAN) and sends a message to the presence agent.

Similarly, at the protocol level in data networks, such as those specified in 3GPP and 3GPP2, certain network boundaries require a signaling message from a UE. This protocol message is usually asynchronous and is no way coordinated with the keep alive timer, or vice versa. Other necessary events also occur periodically.

The problem with the above is that there is an inordinately high electrical current draw in having a radio transmitting and receiving when connecting to the network, sending only a brief data message in a connected state, and then shutting down the radio connection. This is further compounded in networks where the UE does not have control over the latency in tearing down of radio resources when data exchange is completed, such as in a UMTS network.

BRIEF DESCRIPTION OF THE DRAWINGS

The present disclosure will be better understood with reference to the drawings in which.

DETAILED DESCRIPTION

Figure 1:
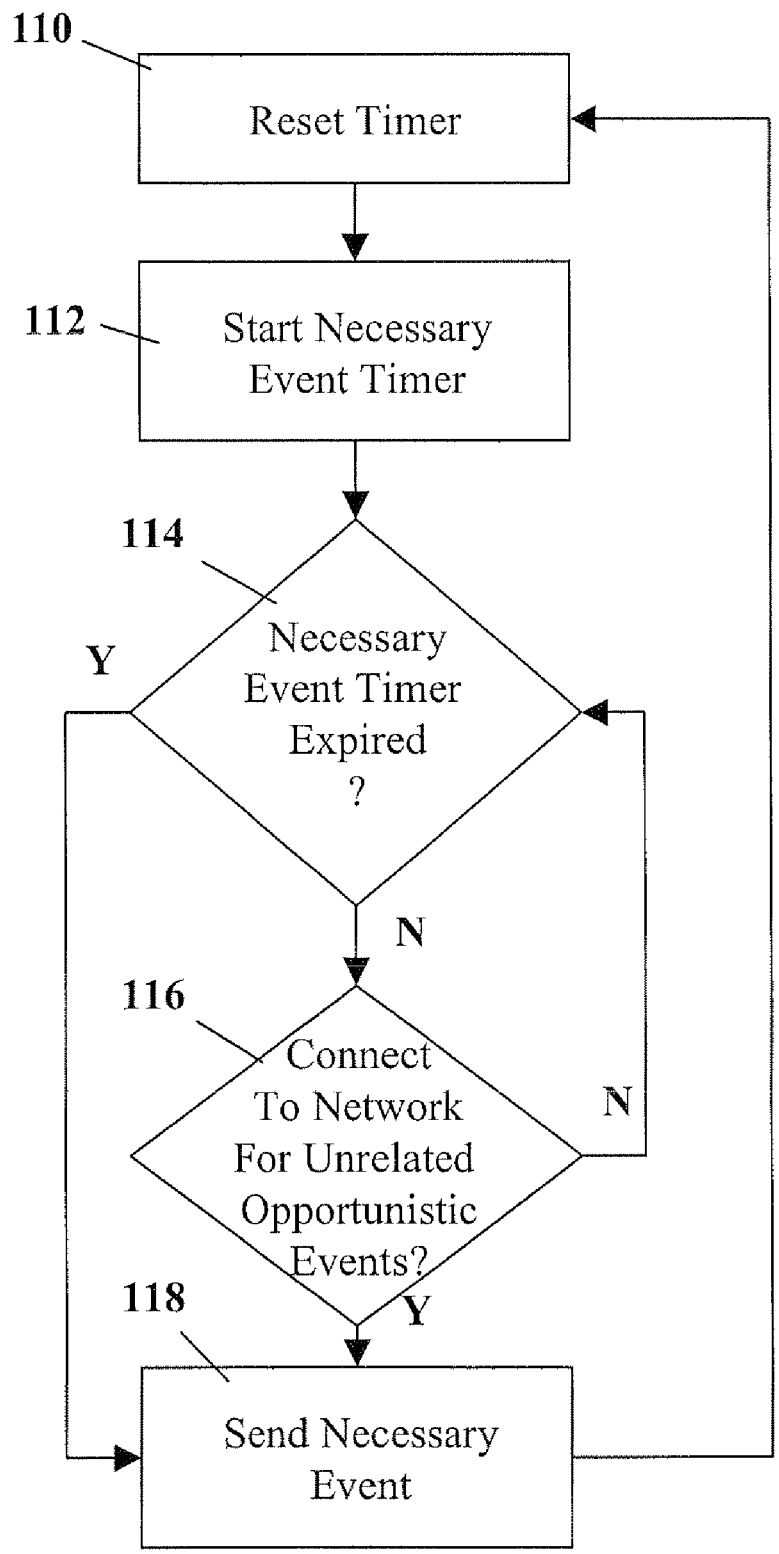
FIG. 1 is a flow chart illustrating one embodiment of the present method.

The present method and apparatus overcome the deficiency of the prior art by providing for the dovetailing of a necessary event such as a "keep alive" function with UE protocol messages or normal usage such as voice calls, thereby reducing overall current draw for the necessary event. In other words, both messages can be sent at the same time, and in doing so, the UE only very marginally increasing the overall current draw of the current 'call', but entirely eliminating another 'call'. Since the protocol messages are asynchronous, the method effectively sends the "keep alive" messages early based on seeing an opportunity to eliminate an extra transmission.

In a further embodiment of the present disclosure, the necessary events may also be sent on an opportunistic basis for normal network usage events such as voice calls or short message service (SMS).

Further, connection to a charger could be viewed as an opportunistic event, since battery life is no longer an issue. In one embodiment, a USB charger plug-in could indicate to the user equipment that a necessary event should be sent.

In a further embodiment, a further condition for sending a necessary event such as a keep alive message is that a minimum threshold time has elapsed since the last keep alive message was sent. This results in the keep alive message being capable of being sent in a window defined at a lower end by a minimum threshold time between keep alive messages, and at an upper end by the length of the keep alive timer. This would be a method to avoid 'over pinging' when normal network signaling messages are in a ping-pong state.

In a further embodiment, automated real time events could be deferred for a period to wait for other opportunistic traffic to dovetail or piggyback the sending of the real time event with.

The present disclosure therefore provides a method for sending an event from user equipment operating in a mobile network, the method comprising the steps of: monitoring whether an unrelated opportunistic event has occurred; and sending said event with said unrelated opportunistic event.

The present disclosure further provides always-on user equipment in a mobile network adapted for sending an event, the user equipment having a radio subsystem including a radio adapted to communicate with the mobile network; a radio processor having a digital signal processor and adapted to interact with said radio subsystem; memory; a user interface; a processor adapted to run user applications and interact with the memory, the radio and the user interface and adapted to run applications, the user equipment characterized by having means for: monitoring whether an unrelated opportunistic event has occurred; and sending said event with said unrelated opportunistic event.

In order to reduce the current draw and battery consumption required to establish a network connection and send a short presence message indicating to a presence agent that the user equipment is still connected to the network, the method of the present apparatus dovetails a necessary event such as a keep alive message, when possible, with other network messages or other normal network usage. In the present disclosure, a keep alive message is used for exemplary purposes to illustrate a necessary event. The keep alive message examples below are not meant to limit necessary events, and any necessary periodic event could replace the keep alive message.

Reference is now made to FIG. 1. FIG. 1 shows an exemplary flow chart of a method in accordance with the present disclosure. In step 110 the user equipment resets a timer. The timer being reset in Step 110 is the keep alive (necessary event) timer that counts down until the next keep alive (necessary event) message needs to be sent. In the prior art, this keep alive timer would require the user equipment to connect to the network and send a keep alive message upon its expiry. Thus, in the prior art, the keep alive message would be sent at regular intervals.

From Step 110, the user equipment proceeds to Step 112 in which the keep alive (or necessary event) timer is started. As will be appreciated, the keep alive timer could be a count down or a count up timer, depending on the implementation, and the present disclosure is not limited to any specific type of timer.

From Step 112, the user equipment proceeds to Step 114. In Step 114, the user equipment checks to see whether the keep alive (or necessary even) timer has expired. If it is determined in Step 114 that the keep alive timer has not expired, the user equipment proceeds to Step 116 in which it checks to see whether a connection is made to the network.

The user equipment could be connecting to the network in Step 116 for a variety of reasons. In one case, a wireless protocol specification could mandate that the UE send a signaling protocol message. Examples include a routing area update, location area update, universal terrestrial radio access network (UTRAN) area update, or other updates known to those in the art. Alternatively, the network can be connected to if data needs to be transmitted from the user equipment to a network or from the network to the user equipment. Examples can include sending or receiving an email message. Other reasons for connecting to the network in Step 116 include for voice calls, short/multimedia message service (SMS), USB charger plug-ins, among others.

If in Step 116 the user equipment is found not to be connected to the network, the user equipment proceeds back to Step 114 in which it checks to see if the keep alive timer has expired. In this way, the user continues to loop until one of the keep live timer has expired or a connection to the network is made.

If the keep alive timer has expired in Step 114, or if the user equipment has connected to the network in Step 116, the user equipment then proceeds to Step 118 in which the keep alive message is sent. As will be appreciated by those skilled in the art, if the keep alive message is sent based on a connection to the network in Step 116, the message is dovetailed with whatever message was being sent to initiate the connection to the network in Step 116.

The above therefore coordinates asynchronous network events with a necessary event. By doing this, network resources are saved, and very little extra current is consumed to support a necessary event timer. The only extra current used during a network connection of Step 116 is the extra battery resources required to send the keep alive message. This battery consumption is small compared with the battery consumption required for connecting to the network exclusively to send the keep alive message.

In one example, the current consumption during a voice call is 230 mA and when data is exchanged at 384 kilobits per seconds in addition to voice, then the total current consumption is 270 mA. Hence the worst case of a simultaneous data call is only 40 mA more whereas a single data call by itself would have consumed 250 mA.

Figure 2:
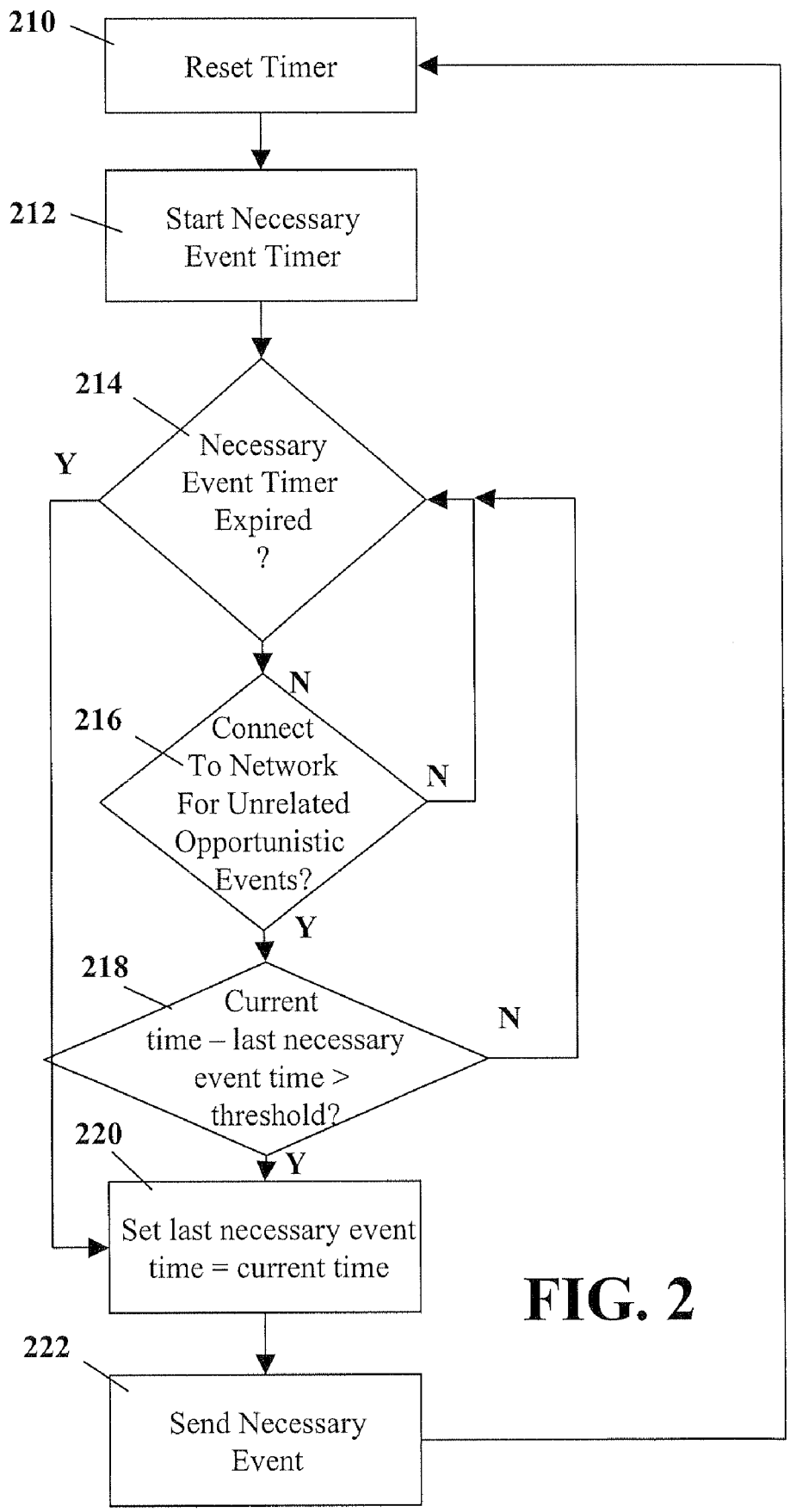
FIG. 2 is a flow chart showing a method of the present disclosure with a back off threshold introduced.

FIG. 2 shows an alternative method that may provide better battery life for situations where the UE is required to connect to the network frequently. This may occur for example when a user is receiving voice calls or SMS messages every few minutes or where the UE is in a ping-pong situation in the network where signaling messages are repeatedly sent in border situations.

Specifically in FIG. 2, a further criterion is added before a necessary event is sent. This criterion checks whether the value of current time minus the time the last keep alive message was sent exceeds a specific threshold.

Referring to FIG. 2, in Step 210, the user equipment resets a keep alive timer and in Step 212 the timer is started. These steps are the same as 110 and 112 from FIG. 1.

The user equipment then, in Step 214, checks to see whether the keep alive timer has expired. As will be appreciated by those skilled in the art, there may be no protocol messages, voice calls, SMS, USB charger plug-ins or any other such opportunistic events during a keep alive timer. Step 214 ensures that the keep alive message is sent within the period expected by the network.

From Step 214, if the keep alive timer has not expired the user equipment proceeds to Step 216 in which it checks to see whether there is a connection to the network. As indicated with respect to Step 116 and FIG. 1 above, the connection to the network can be for a variety of reasons including protocol messages, and other opportunistic messages such as voice calls, SMS, USB charger plug-ins or the like.

If in Step 216 it is discovered that the network has not been connected to, the user equipment proceeds back to Step 214 in which it checks again whether the keep alive timer has expired, thus looping between Steps 214 and 216. As will be appreciated, the keep alive timer and network connection could be interrupt driven, rather than utilizing processor capacity to continually loop between these steps.

If the user equipment finds in Step 216 that the network has been connected to, the user equipment proceeds to Step 218. In Step 218 the user equipment checks whether the current time minus the last keep alive time is greater than a threshold. In other words, the user equipment keeps track of when it last sent a keep alive message and records this time. It then does a comparison between the current time and the last time it sent the keep alive message. A threshold value, which is predetermined, can be used to determine with the user equipment should send another keep alive message.

Step 218 ensures that a necessary event is not sent too frequently. For example, user equipment may wish to send keep alive messages any time from 10 minutes to 15 minutes from the last time the keep alive message was sent. Thus, if a voice call is received at 6 minutes after the last keep alive message was sent, the user equipment will realize that it is too soon to send another keep alive message and based on FIG. 2 will proceed back to Step 214.

If the current time minus the necessary event time is greater than the threshold, then it is time to send another keep alive message and the user equipment proceeds to Step 220. In Step 220 the last keep alive time is set to equal the current time. In Step 222 the user equipment then sends the necessary event.

Alternatively, if the keep alive timer has expired before a connection to the network, the user equipment proceeds from Step 214 directly to Step 220.

The example above uses a threshold between 10 and 15 minutes before the next time a keep alive message is sent. This is merely meant for illustrative purposes and is not meant to limit the scope of the present disclosure. The value of the threshold and the keep alive time can be determined based on various criteria, and can be optimized for various networks.

Another example of using opportunistic events to save battery life and network resources is the case of automated real time events. As will be appreciated, a user equipment will occasionally be required to perform certain functions which are not necessarily periodic but which need to occur regularly. These include personal information management (PIM), email filter and setting configuration, among others.

Figure 3:
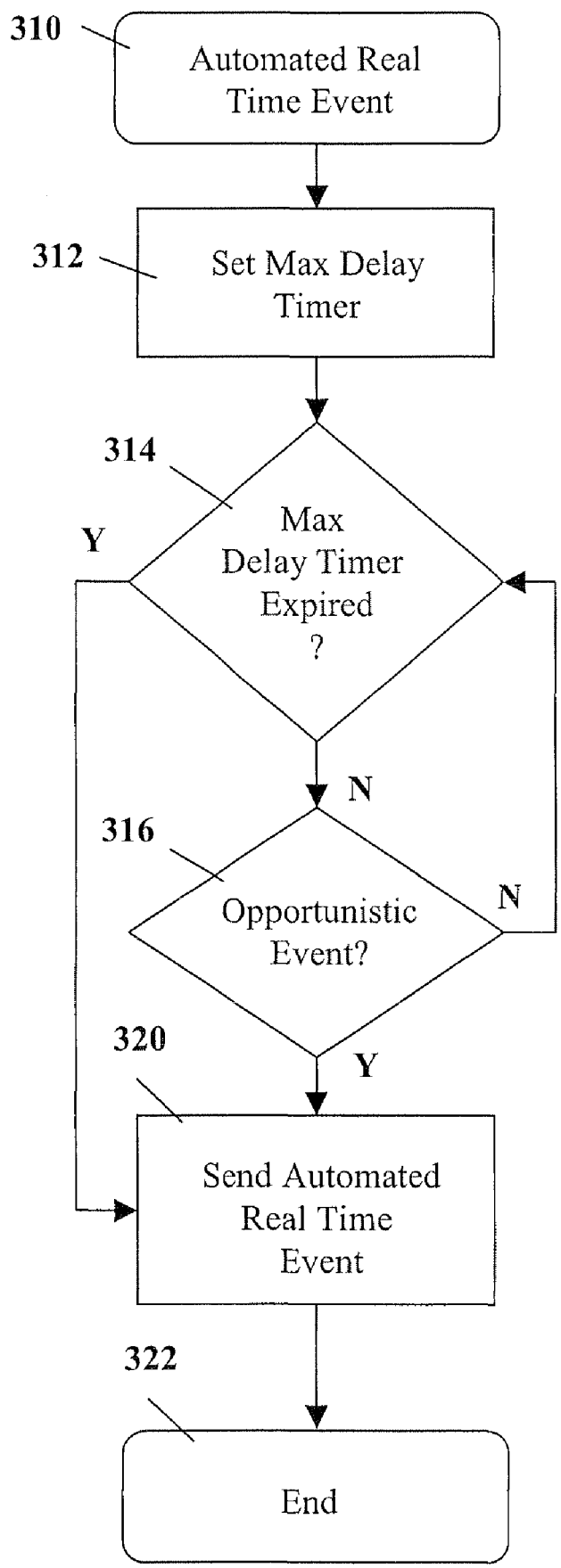
FIG. 3 is a flow chart showing the deferral of real time events to wait for an opportunistic event.

Referring to FIG. 3, an automated real time event is required in step 310. As illustrated, the process proceeds to step 312 in which a maximum delay timer is set. As will be appreciated by those skilled in the art, the maximum delay timer can be set based on the real time event that is occurring in step 310. Certain events could be delayed for longer than others and the present disclosure is not limited by the length of the delay set.

The process next proceeds to step 314 in which a check is performed to see whether the maximum delay timer has expired.

If the maximum delay timer in step 314 has not expired, the process proceeds to step 316 in which a check is performed to see whether an opportunistic event has occurred. Such opportunistic events are described above, and can include a voice call, mobile terminated e-mail or data, mobile originating e-mail or data, short message service, among others.

If an opportunistic event has not occurred, the process proceeds between step 314 and 316 until either the maximum delay timer has expired or the opportunistic event has occurred.

In either case, the process proceeds from step 314 or 316 to step 320, in which the automated real time event is sent to the network.

As will be appreciated by those skilled in the art, if the process proceeded to step 320 from step 316, an opportunistic event had occurred and thus the automated real time event was able to be piggybacked or dovetailed onto the opportunistic event, thereby saving battery life and network resources. The above method therefore delays or defers the sending of data until an opportunistic event has occurred, or until a maximum delay time has been reached.

The process then proceeds to step 322 in which it ends.

Figure 4:
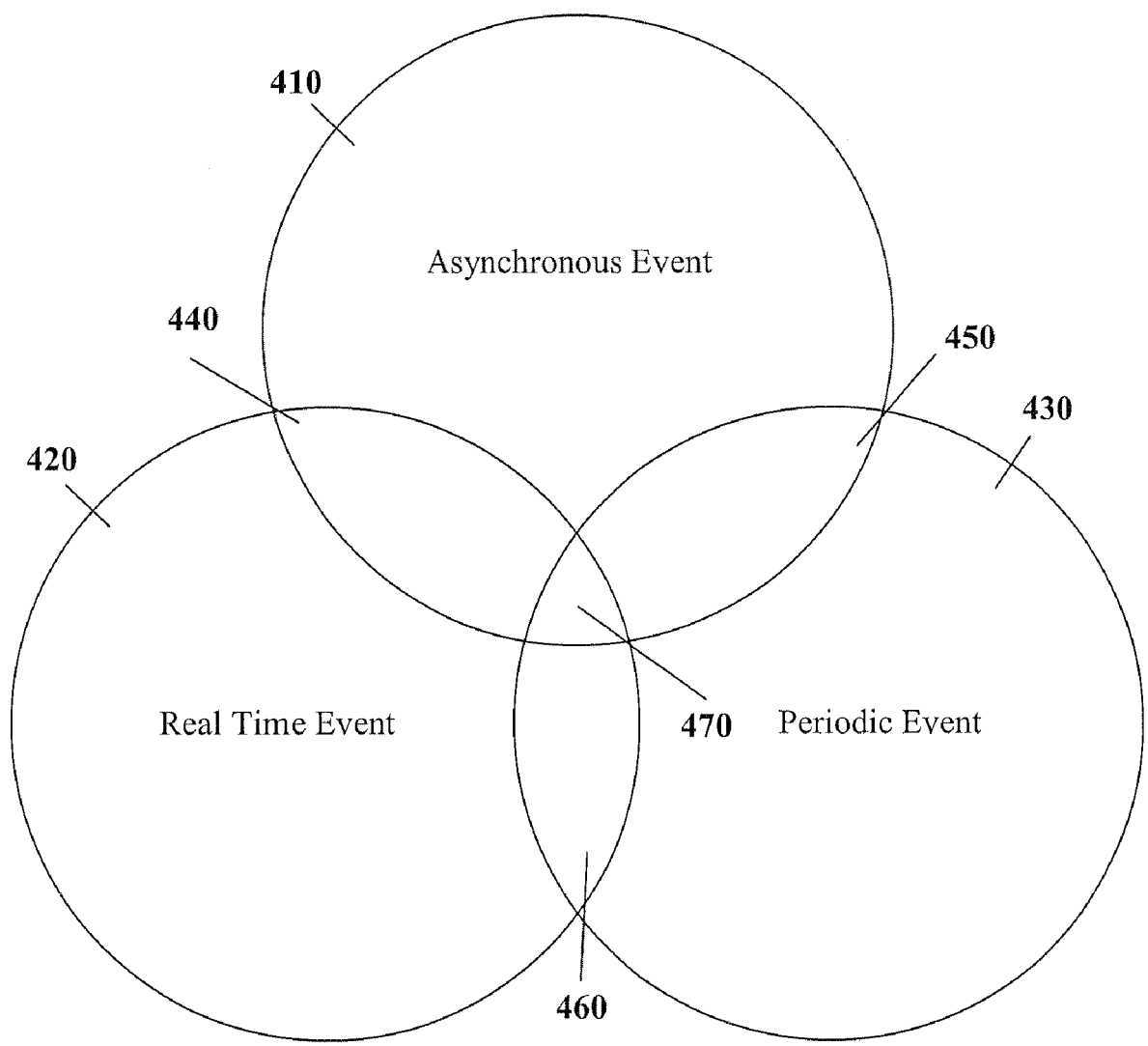
FIG. 4 is a Venn diagram showing the relationship between various events.

The above methods of FIGS. 1, 2 or 3 can be combined and FIG. 4 illustrates a Venn diagram showing the various events and the way that they can be combined for opportunistic purposes. As indicated above, asynchronous events include voice call signaling, mobile terminated e-mail or data, mobile originated e-mail or data, good radio conditions, the plugging in of a USB charger, among others.

Real time events 420 include both batch and automated real time events. Batch events include resetting of device options such as the device font or theme, call options, message list options, the real time updating of call logs, e-mail reconciliation, global positioning system (GPS) constellation tracking, pinging for presence among others. Automated real time events include personal information management, e-mail filters or e-mail settings among others.

Periodic events include events that occur periodically, such as the sending of a keep alive message as described above.

The intersection of these three events presents the opportunity to piggyback or co-ordinate the events in order to save battery life or network resources by sending messages together, thereby combining the hand shaking and connection setup overhead to the network for each event.

As seen in FIG. 4, area 440 includes the intersection between a real time event and an asynchronous event, and the method for this is illustrated in FIG. 3. Area 440 allows the deferral of the sending of data for a automated real time event until an asynchronous event occurs or until a certain predetermined time has elapsed.

Area 450 is described in relation to the methods of FIGS. 1 and 2. This area allows the acceleration of the sending of periodic data such as keep alive messages. For example, if an asynchronous event 410 occurs prior to the scheduled trigger time of a periodic event, the trigger time for the periodic event can be accelerated to take advantage of the asynchronous event 410.

Area 460 allows the piggybacking of real time events with periodic events. This can occur, for example, if in the method of FIG. 3 the maximum delay timer has timed out and therefore the real time event needs to be sent. In this case, the real time event could be an opportunistic event for the periodic event 430 and therefore the two can be piggybacked together.

Area 470 illustrates when an asynchronous event occurs while both the real time event 420 is waiting for an opportunistic event and periodic event 430 is within a window that allows the sending of the periodic event 430. In this case, all three events are piggybacked together.

Those skilled in the art will realize that the above is particularly relevant and useful in situations where the user equipment does not have control over the radio connection with the network. For example, in current UMTS networks, a radio resource control (RRC) part of the protocol stack is responsible for the assignment, configuration and release of radio resources between the UE and the UTRAN. This RRC protocol is described in detail in the 3GPP TS 25.331 specifications. Two basic modes that the UE can be in are defined as "idle mode" and "connected mode". In an idle mode, the UE is required to set up an RRC connection where whenever it wants to send any user data or whenever the UTRAN or servicing GPRS support mode (SGSN) pages it so the UE can receive data from an external data network such as a push server. Idle and connecting mode behaviors are described in detail in the 3GPP specifications TS 25.304 and TS 25.331 respectively.

The transition from an idle to a connecting mode and vice versa is controlled by the UTRAN, and not the UE. The problem with this, especially when considering the brief data exchange required for a keep alive message, is that even if an application on the UE has completed its data transaction and is not expecting and further data exchange, it still waits for the network to move it to the correct state. The network may not even be aware of the fact that the application on the UE has completed its data exchange. By keeping the RRC connection open, the UE is required to expend battery resources to keep its radio on and monitor a dedicated channel or a forward access channel, thereby requiring the UE to stay in a higher than required state or mode, draining battery life and wasting network resources. It thus makes sense to put the UE in this discrete state as few times as possible for only sending keep alive messages, by taking advantage of other times the radio is 'on' for corollary purposes such as signaling or voice calls.

One skilled in the art will further realize that the present method and apparatus could be used with other types of networks besides UMTS, including, but not limited to GPRS and CDMA.

Figure 5:
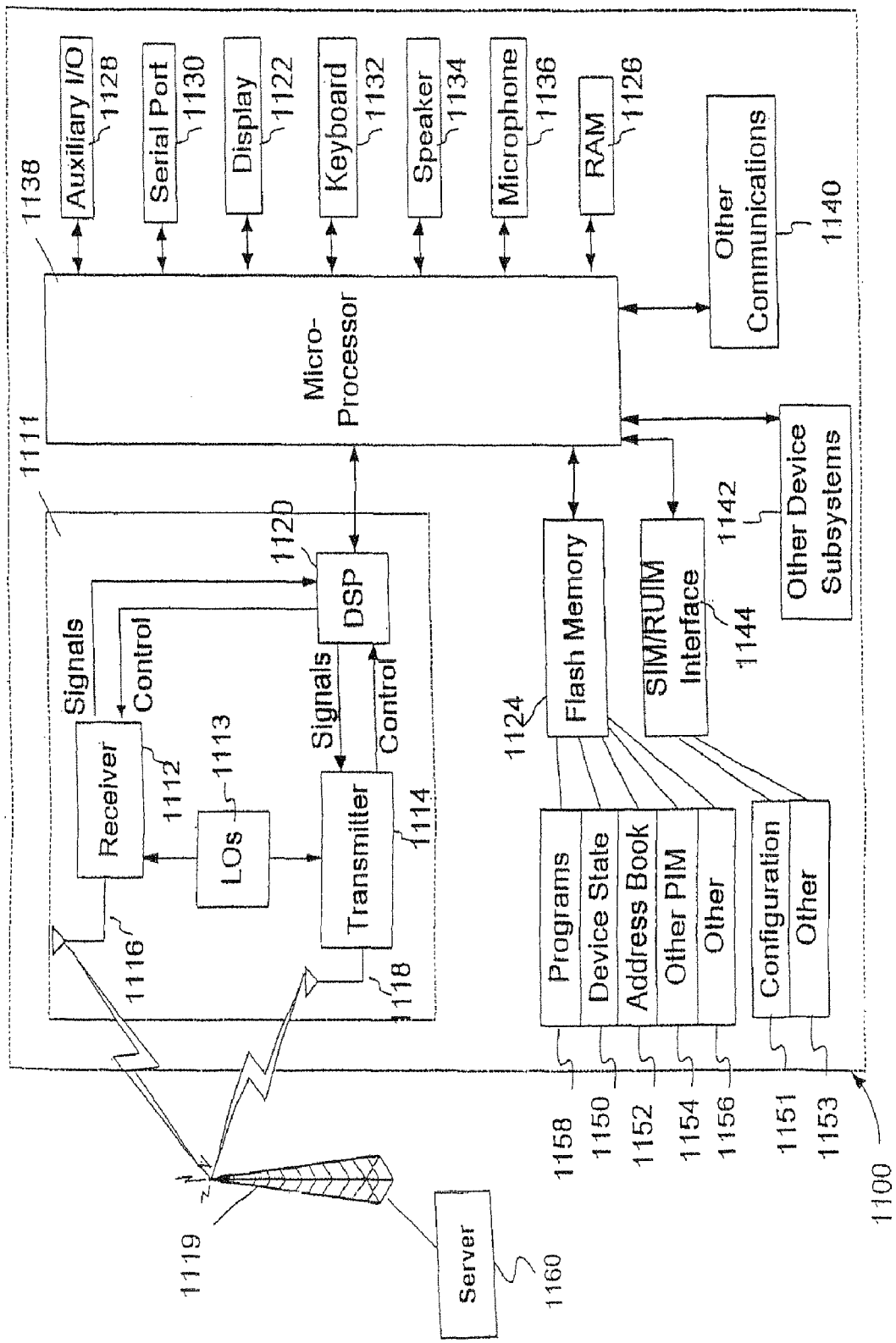
FIG. 5 is a block diagram showing an exemplary user equipment that can be used in association with the present method.

The above method can be implemented on a variety of mobile devices or user equipment. An example of one mobile device is outlined below with respect to FIG. 5. Reference is now made to FIG. 5.

UE 1100 is preferably a two-way wireless communication device having at least voice and data communication capabilities. UE 1100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where UE 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate. For example, UE 1100 may include a communication subsystem 1111 designed to operate within the GPRS network or UMTS network.

Network access requirements will also vary depending upon the type of network 1119. For example, In UMTS and GPRS networks, network access is associated with a subscriber or user of UE 1100. A GPRS mobile device therefore requires a subscriber identity module (SIM) card in order to operate on a GPRS network. Without a valid SIM card, a GPRS/UMTS mobile device may not be fully functional. Local or non-network communication functions, as well as legally required functions (if any) such as emergency calling, may be available, but mobile device 1100 will be unable to carry out any other functions involving communications over the network 1100. The SIM interface 1144 is normally similar to a card-slot into which a SIM card can be inserted and ejected like a diskette or PCMCIA card. The SIM card can have approximately 64K of memory and hold many key configuration 1151, and other information 1153 such as identification, and subscriber related information.

When required network registration or activation procedures have been completed, UE 1100 may send and receive communication signals over the network 1119. Signals received by antenna 1116 through communication network 1119 are input to receiver 1112, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network 1119 may further communicate with multiple systems, including a server 1160 and other elements (not shown). For example, network 1119 may communicate with both an enterprise system and a web client system in order to accommodate various clients with various service levels.

UE 1100 preferably includes a microprocessor 1138 which controls the overall operation of the device. Communication functions, including at least data and voice communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 5 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126. Further, a unique identifier is also preferably stored in read-only memory.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile device. A predetermined set of applications that control basic operations, including at least data and voice communication applications for example, will normally be installed on UE 1100 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile device user's corresponding data items stored or associated with a host computer system. Further applications may also be loaded onto the mobile device 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the UE 1100. These applications will however, according to the above, in many cases need to be approved by a carrier.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of UE 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of UE 1100 is similar, except that received signals would preferably be output to a speaker 1134 and signals for transmission would be generated by a microphone 1136. Alternative voice or audio I/O subsystems, such as a voice message recording subsystem, may also be implemented on UE 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 5 would normally be implemented in a personal digital assistant (PDA)-type mobile device for which synchronization with a user's desktop computer (not shown) may be desirable. Such a port 1130 would enable a user to set preferences through an external device or software application and would extend the capabilities of mobile device 1100 by providing for information or software downloads to UE 1100 other than through a wireless communication network. The alternate download path may for example be used to load an encryption key onto the device through a direct and thus reliable and trusted connection to thereby enable secure device communication.

Alternatively, serial port 1130 could be used for other communications, and could include as a universal serial bus (USB) port. An interface is associated with serial port 1130.

Other communications subsystems 1140, such as a short-range communications subsystem, is a further optional component which may provide for communication between UE 1100 and different systems or devices, which need not necessarily be similar devices. For example, the subsystem 1140 may include an infrared device and associated circuits and components or a Bluetooth™ communication module to provide for communication with similarly enabled systems and devices.

The embodiments described herein are examples of structures, systems or methods having elements corresponding to elements of the techniques of this disclosure. This written description may enable those skilled in the art to make and use embodiments having alternative elements that likewise correspond to the elements of the techniques of this disclosure. The intended scope of the techniques of this disclosure thus includes other structures, systems or methods that do not differ from the techniques of this disclosure as described herein, and further includes other structures, systems or methods with insubstantial differences from the techniques of this disclosure as described herein.

We claim:

1. A method for sending a necessary event from a mobile device operating in a mobile network, the method comprising:
   setting an event timer to count a period of time until a next necessary event needs to be sent, the necessary event being an event required to be sent at regular intervals;
   detecting by said mobile device, an unrelated opportunistic event associated with said device and sending by said mobile device said necessary event if said unrelated opportunistic event is detected; and
   sending said necessary event if said detecting does not find that an unrelated opportunistic event has occurred prior to the expiration of the period of time.

2. The method of claim 1, wherein said method further includes resetting the event timer after said sending.

3. The method of claim 1 further comprising checking whether a time elapsed since a previous necessary event was transmitted to a network exceeds a threshold, said checking occurring after said monitoring detects a network connection and before the transmitting, said checking blocking said transmitting if the time elapsed is below the threshold.

4. The method of claim 1, wherein said necessary event is a keep alive message.

5. The method of claim 1, wherein said necessary event is an automated real time event.

6. The method of claim 5, wherein said method further includes:
   setting a maximum delay timer; and
   transmitting said automated real time event upon the expiration of said maximum delay timer, wherein said transmitting occurs if said monitoring does not detect an opportunistic event.

7. The method of claim 6, further comprising resetting said maximum delay timer after said transmitting.

8. The method of claim 1, wherein the opportunistic event is an asynchronous event.

9. The method of claim 8, wherein the asynchronous event is one of an email or other application level message, a voice call and a short/multimedia message service being sent or received by the mobile device.

10. The method of claim 1, wherein the opportunistic event is the connection of the mobile device to a charger.

11. The method of claim 1, wherein the mobile network is one of a UMTS network, a GPRS network, a CDMA network.

12. The method of claim 11, wherein if the mobile network is the UMTS network, the sending prevents an extra network connection to a Cell_DCH or Cell_FACH state.

13. The method of claim 1, wherein said opportunistic event is a transmission to the network and said necessary event is transmitted together with said opportunistic event transmission.

14. A mobile device in a mobile network configured to send a necessary event, the mobile device having a radio subsystem including a radio adapted to communicate with the mobile network; a radio processor having a digital signal processor and adapted to interact with said radio subsystem; memory; a user interface; a processor adapted to run user applications and interact with the memory, the radio and the user interface and adapted to run applications, the mobile device characterized by having means for:
   setting an event timer to count a period of time until a next necessary event needs to be sent, the necessary event being an event required to be sent at regular intervals;
   detecting by said mobile device, an unrelated opportunistic event associated with said device and sending by said mobile device said necessary event if said unrelated opportunistic event is detected; and
   sending said necessary event if said detecting does not find that an unrelated opportunistic event has occurred prior to the expiration of the period of time.

15. The mobile device of claim 14, wherein the mobile network is one of a GPRS network, a CDMA network and a UMTS network.

16. The mobile device of claim 14, wherein the opportunistic event detected by the means for monitoring is caused by a protocol message being sent from the mobile device.

17. The mobile device of claim 16, wherein the protocol message is one of a routing area update, a location area update, or a universal terrestrial radio access network area update.

18. The mobile device of claim 14, wherein the opportunistic event detected by the means for monitoring is caused by one of an email or other application level message, a voice call and a short/multimedia message service being sent or received by the mobile device.

19. The mobile device of claim 14, wherein the means for monitoring is adapted to monitor whether the mobile device is connected to a charger, and if yes, the means for monitoring is adapted to send the message to the network.

20. The mobile device of claim 14, further characterized by means for:
 setting an event timer; and
 said sending of said necessary event if an unrelated opportunistic event is not detected prior to the expiration of the event timer.

21. The mobile device of claim 20, further characterized by means for checking whether a time elapsed since a previous necessary event was transmitted to a presence agent exceeds a threshold, said means for checking adapted to block the transmitting of the message if the time elapsed is below the threshold.

22. The mobile device of claim 14, wherein said necessary event is an automated real time event.

23. The mobile device of claim 22, further comprising means for resetting said maximum delay timer.

24. The mobile device of claim 14, wherein the opportunistic event is an asynchronous event.

25. The mobile device of claim 14, wherein said opportunistic event is a transmission to the network and said necessary event is transmitted together with said opportunistic event transmission.

* * * * *